2,914,488
PREPARATION OF ETA ALUMINA UTILIZING CHLORINE AND AMMONIA

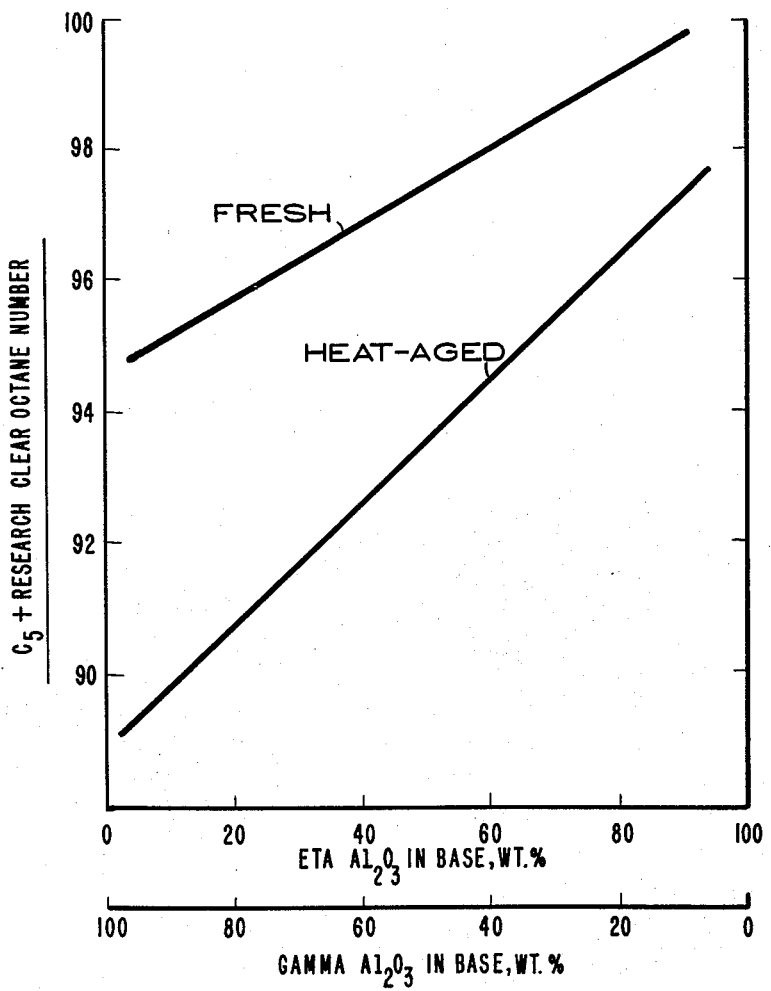

George R. Gilbert, Elizabeth, N.J., assignor to Esso Research and Engineering Company, a corporation of Delaware Application January 5, 1954, Serial No. 402,235

6 Claims. (Cl. 252—466)

This invention relates to the preparation of improved solid catalysts for the conversion of hydrocarbon materials. More particularly, it relates to the improved preparation of eta alumina, an exceedingly effective support material for catalysts, especially platinum-containing hydroforming catalysts.

Recent developments in the petroleum refining industry have concentrated attention upon methods for the conversion of low boiling feed stocks, particularly those in the middle and heavy portions of the naphtha boiling range, into products of improved octane number. Considerable success along these lines has been obtained by the process known as hydroforming. In this process the hydrocarbon feed stock is treated at operating temperatures of about 700°–1100° F., in the presence of a catalyst of suitable activity and in a hydrogen-containing atmosphere at such pressure that the hydrocarbon transformation reactions taking place result in a net production of hydrogen. A variety of reactions are involved, which include dehydrogenation, paraffin and naphthene isomerization, cyclization, or aromatization. All of these result together in producing a product of markedly improved motor fuel value as determined by octane rating.

The operating conditions of the hydroforming operation are pressures in the range of 50 to 1000 p.s.i.g., usually 100 to 700 p.s.i.g., and temperature in the range of 700°–1100° F., usually 875°–950° F. The hydrogen dilution may vary from about 1000 to 10,000 c.f./b.

The feed or charging stock to the hydroforming reactor can be a virgin naphtha, a cracked naphtha, a Fischer-Tropsch naphtha, mixtures of these, or the like. The feed stock is preheated alone or in admixture with recycle gas to reaction temperature or to the maximum temperature possible while avoiding thermal degradation of the feed stock.

A particularly useful catalyst for these operations has been found to be platinum supported on an alumina base. For instance, a commonly used composition of such catalyst is one containing from 0.001 to 2.0 weight percent platinum, the remainder being the alumina spacing agent or base.

A particularly suitable form of alumina for use as a support material has been prepared according to the process of U.S. Patent No. 2,636,865. This process comprises reacting aluminum metal with a water-insoluble anhydrous alcohol, hydrolyzing the aluminum alcoholate, separating the hydrous alumina from the alcohol, and recovering the alumina from its aqueous slurry. The hydrolysis temperature utilized is in the range of 70°–200° F., and supplies an effective catalyst support. The alumina produced thereby, however, has been shown to contain only about 30% eta alumina, with the remainder in the gamma form. Experiments have now demonstrated that catalyst activity and activity maintenance are improved as the eta alumina content of the support is increased. This improvement is effected without impairing the selectivity to $C_5+$ product. It is therefore desirable to obtain alumina support materials consisting predominantly, i.e., at least 80 weight percent, or essentially of eta alumina.

It has now been found that eta alumina can be formed in quantitative yields, 100% if desired, very economically by treating aluminum metal with chlorine water and following this treatment by a further treatment with ammonia. A hydrous alumina slurry is obtained, which upon drying and calcination is converted to the crystalline eta alumina. The eta alumina can then be admixed with other catalyst components by means known to the art.

It is surprising to find that the treatment of this invention results in a quantitative production of eta alumina in view of the fact that treating aqueous aluminum chloride with ammonia gives markedly inferior results.

Metallic aluminum such as chips, turnings, or the like, are contacted with chlorine water. The amount of water utilized is conveniently in an amount of 0.5 to 10 liters per 100 grams of aluminum. Chlorine is conveniently bubbled into the water, being utilized in an amount of from 0.1 to 1.5 grams per 100 ml. of water. A temperature in the range of 60°–200° F. is employed and good agitation is provided. The time of chlorine treat is in the range of about 5 to 120 minutes.

A convenient manner of treating the aluminum metal with water containing chlorine gas is by maintaining the metal in the form of a column. Chlorine water is passed up through the column and excess chlorine is vented. The current flow is sufficient to rub off the bubbles of gaseous material which adheres to the alumina surface so the reaction can proceed vigorously. The aluminum-containing solution can be withdrawn continuously or periodically while an equivalent amount of water or chlorine water is admitted. The aluminum metal can be replaced as consumed. The chlorine gas need not be fed continuously because after the reaction has started no more chlorine gas need be added. The aluminum surface is activated so that the initial chlorine gas is the only additive needed. No catalysts are required.

The resulting aluminum-containing solution can be separated from the unreacted aluminum and contacted with a minor quantity of ammonia, since the pH of the solution is only slightly acid. The temperature is kept in the range of 50°–80° F., and the ammonia is added to a pH of about 6.5 to 9 with good agitation.

The resulting solution when made ammoniacal first becomes relatively viscous and then deposits a white hydrous alumina slurry. The alumina can be separated and recovered by filtration or other removal of the water, ammonia, and chlorine, if any is present, as by heating. The separated alumina can be washed with water and the alumina refiltered or redried by heating. The separated alumina or alumina slurry in which the alumina is in the beta trihydrate form is then preferably dried at a temperature in the range of 250°–400° F. to remove any ammonia, chlorine and aqueous medium in which it is contained and recover the alumina. Crystalline eta alumina is formed by further dehydrating the beta alumina trihydrate (Bayerite). It has been found that this conversion is essentially quantitative when the activating temperature is in the range of 400°–1250° F., preferably 450°–1100° F. The activation is generally in the presence of air, but can be done in vacuum or other inert gases. Because of the aforementioned transformation of beta trihydrate to eta alumina, this can also be used to indicate the amount of eta phase in the alumina made by activating the product of the hydrolysis.

This calcination or activation treatment can alternatively follow the addition of the catalyst component where the combined catalyst is heated in the same temperature range. This is explained in further detail below, In a similar manner the dehydrogenation or active catalytic component can be added to the base either before or after the latter is dried.

The eta alumina can be converted into a hydroforming catalyst by the addition of molybdenum oxide, vanadium oxide, tungsten oxide or chromium oxide, or metallic salts of molybdic acid such as calcium molybdate or cobalt molybdate or preferably precious metals such as platinum or palladium. The incorporation of the catalytic component can be effected in any of a variety of ways well known to the art. For example, molybdenum oxide can be incorporated by slurrying the molybdenum oxide with the hydrous alumina (from which $NH_3$ and $Cl_2$ have been removed) or the latter can be dried and the molybdenum oxide sublimed thereon. Alternatively the molybdenum oxide can be incorporated by treating the alumina with ammonium molybdate.

The amount of catalytic component added can be varied, depending to a large degree upon the particular material used. For the most part the catalytic metal oxides or metallic salts of molybdic acid are applied in sufficient amount to give from about 5 to 20 weight percent of the said component in the final composite, although in the case of chromium oxide as much as 40 weight percent may be incorporated. In the case of the precious metal catalysts about 0.001 to 2.0 weight percent of platinum or about 0.5 to 5.0 weight percent of palladium will suffice to give a catalyst of the desired activity. The dehydrogenating or active catalytic component can be added to the base either before or after the latter is dried, as explained before. It is ordinarily preferred to subject the catalyst to a calcination treatment or heating to temperatures of up to about 1200° F. prior to use in a reforming or hydroforming process.

Because of the marked superiority of eta alumina as a support for platinum catalysts, more detailed information is supplied on the preparation of these materials.

The platinum is impregnated on the alumina support by means known in the art. One of the better means involves treatment of the eta alumina support of this invention in the hydrous, dried or calcined form with aqueous solutions of water-soluble inorganic platinum-containing compounds. The term "water-soluble" also includes platinum-containing compounds which form colloidal solutions. Typical of the water-soluble inorganic platinum-containing compounds are chloro-platinic acid, potassium platinum chloride, platinum disulphide, tetrammino platino chloride, potassium platino-nitrite, dichloro diammino platinum, ammonium platino-nitrite, and dinitrito-diammino-platinum. A conveniently used aqueous platinum solution is one containing 15 grams of $H_2PtCl_6 \cdot xH_2O$ (40% Pt) per liter. This strength can be employed to yield catalysts containing about 0.5% platinum; lower or higher concentrations are employed when it is desired to alter the platinum content of the final catalyst. The gross amount of solution utilized is preferably that required to impregnate with the desired amount of platinum by just wetting the total alumina. The alumina support in the platinum solution is heated to dryness, conveniently at temperatures of about 100°–600° F. at atmospheric pressure, which results in removal of a substantial portion of the water.

The final step in the preparation involves the subjection of the dried catalyst to a reduction step. This reducing step can be carried out by means known in the art, such as hydrogenation, calcination, and treatment with chemical reducing agents. Typical of these reduction operations is treatment with hydrogen at 200°–1000° F. with hydrogenation pressures of atmospheric to 1000 pounds p.s.i.g. Calcining can be carried out at temperatures of the order of about 1100° F., e.g., 800°–1250° F. Both types of operations are preferably carried out slowly, for example, over the course of about 4 to 24 hours.

It has also been found desirable to treat the catalyst, either before (in the $NH_3$ and $Cl_2$ free hydrous, dry or calcined form), after, or during impregnation of the active catalytic component, with an aqueous dilute combined acid solution, i.e., an oxidizing acid such as $HNO_3$, perchloric acid, or hypochlorous acid, together with a hydrogen halide such as HCl, HF, HI, and HBr. $HNO_3$ and HCl are preferred. It has been found that 0.1 to 8 weight percent nitric acid based on the total catalyst and 50–500 weight percent water is suitable. It is preferred to employ a dilute solution which is about 0.01 molal to 2.5 molal $HNO_3$.

The HCl is employed in an amount of about 1 to 30 weight percent based on the catalyst. This acid is contained in from 50 to 500 weight percent water based on the supported catalyst. These concentrations of acid do not dissolve the support appreciably. It is preferred to use solutions which are from 0.1 molal to about 3 molal HCl.

It is also advantageous to treat the fresh catalyst with gaseous halogen, e.g., chlorine, in an amount of from 0.1 to 10 weight percent on catalyst and preferably 1 to 3 weight percent.

This invention will be better understood by reference to the following examples of the preparation and the advantages of the catalyst of this invention.

*Example I*

200 grams of powdered aluminum metal were treated over a steam bath with three liters of water. The temperature of the treating solution was 200° F. Chlorine gas was bubbled in occasionally, while stirring vigorously. The supernatant milky layer was decanted and accumulated. The water was replenished and the preceding procedure was repeated. While stirring, a small quantity of dilute ammonium hydroxide was added to the composited liquid until a pH of 8 was obtained. The resulting slurry was filtered and the precipitated alumina was washed with water. The hydrous alumina slurry was dried at 250° F. and then calcined at 1100° F. X-ray data established that the resulting alumina product was predominantly crystalline eta alumina. The surface area of this alumina was 262 m.$^2$/gm.

The washed unreacted aluminum metal evolved gas bubbles when heated with fresh water to which no chlorine gas was added.

*Example II*

The advantage of catalysts containing eta alumina as the support is demonstrated in this example. Catalysts were prepared containing 0.6 weight percent platinum on alumina containing varying amounts of eta alumina (the remainder gamma). These catalysts were used in the hydroforming of a Coastal virgin naphtha feed of 50 octane number boiling in the range of 200°–330° F. The conditions were 200 p.s.i.g., 900° F., 6/1 hydrogen/hydrocarbon ratio and 4 wt./hr./wt. The results of the hydroforming, as well as the subjecting of these catalysts to the deleterious effect of heat aging, are shown in the graph in the drawing.

It can be seen from the figure that catalyst made with eta alumina has an activity indicated by 100+ octane number, whereas the gamma alumina leads to an activity of only 94.5 octane number. The stability against deactivation by aging (i.e., crystal growth of platinum through prolonged use and repeated regenerations) is indicated in the lower curve. These catalysts were given an accelerated aging test by heating at 1250° F. for 64 hours in air. This treatment is estimated to be much more severe than that encountered in a year of regenerative operation. It can be seen that the catalyst with the eta alumina base is decidedly superior to that with the gamma alumina base—98 O.N. v. 89 O.N. Furthermore, it can be noted that upon heat aging, the catalyst made with eta alumina decreases only two octane numbers, whereas the catalyst made with gamma alumina decreases about 6 octane numbers.

Example III

For comparison an alumina made by adding ammonium hydroxide to the same pH to a solution of aluminum chloride in water was used as a base for a platinum catalyst. The octane number obtained with this catalyst in a controlled hydroforming operation was only 89 as compared to 98 octane number obtained with the base made according to this invention in Example I. The details of the hydroforming operation are disclosed in Example II above.

The catalysts of this invention are adapted for use in hydroforming, hydrogenation, hydrocracking, cracking, oxidation, and other reactions known to those in the art. The eta alumina can also be used as an adsorbent or filler for rubber.

Other halogens such as iodine or bromine can be employed for all or part of the chlorine.

The specific names of the crystal modifications of alumina and the alumina hydrates now commonly accepted in the literature and used here are described in detail in an article by H. C. Stumpf et al. of the Aluminum Company of America, in Industrial and Engineering Chemistry, volume 42, page 1398, July 1950.

The method of this invention is applicable to the preparation of pilled, powdered, pelleted, etc., catalysts.

Although ammonia hydrolysis is the preferred modification of this invention, organic bases such as amines, piperidine, as well as hydrozines, can be used to advantage in some cases.

The term "solution" as used herein connotes colloidal as well as true solutions.

It is to be understood that this invention is not limited to the specific examples, which have been offered merely as illustrations, and that modifications may be made without departing from the spirit of the invention.

What is claimed is:

1. The method of preparing alumina especially adapted for use as a catalyst support and consisting predominantly of eta alumina, which comprises the steps of treating aluminum metal with chlorine water; adding ammonia to the resulting solution to form a slurry of hydrous alumina; drying the alumina slurry to remove the aqueous medium and any chlorine and ammonia present and recover the alumina; and heating it to a temperature in the range of 400°–1250° F. to further dehydrate it.

2. The method of preparing alumina especially adapted for use as a catalyst support and consisting predominantly of eta alumina, which comprises the steps of treating aluminum metal with chlorine water, the amount of water being in the range of 0.5 to 10 liters per 100 grams of aluminum and the amount of chlorine being in the range of 0.1 to 1.5 grams per 100 ml. of water, at a temperature in the range of 60°–200° F.; adding ammonia to the resulting solution until a pH in the range of 6½ to 9 is obtained to form a slurry of hydrous alumina; drying the alumina slurry to remove the aqueous medium and any chlorine and ammonia present and recover the alumina; and heating it to a temperature in the range of 400°–1250° F. to further dehydrate it.

3. The process of claim 2 in which the time of the treatment with chlorine water is in the range of 5–120 minutes.

4. The method of preparing an alumina especially adapted for use as a catalyst support and consisting of eta alumina, which comprises the steps of treating aluminum metal with about 1½ liters of chlorine water per 100 grams of aluminum at a temperature of 200° F.; adding ammonia to the resulting solution until a pH of 8 is obtained to form a slurry of hydrous alumina; drying the slurry to remove the aqueous medium and any ammonia and chlorine present and recover the alumina; and heating the alumina to a temperature of 1100° F. to further dehydrate it.

5. An improved method of preparing a catalyst comprising the steps of treating aluminum metal with chlorine water, adding ammonia to the resulting solution to form a slurry of hydrous alumina, drying the alumina slurry to remove the aqueous medium and any chlorine and ammonia present and recover the alumina, and heating it to a temperature in the range of 400° to 1250° F. to further dehydrate it, and thereafter supporting a catalytic agent on the said treated alumina.

6. The method defined by claim 5 in which the said catalytic agent is platinum.

References Cited in the file of this patent

UNITED STATES PATENTS

| | | |
|---|---|---|
| 2,184,235 | Groll | Dec. 19, 1939 |
| 2,479,110 | Haensel | Aug. 16, 1949 |
| 2,658,028 | Haensel | Nov. 3, 1953 |
| 2,667,404 | Haensel | Jan. 26, 1954 |
| 2,739,945 | Thorn | Mar. 27, 1956 |
| 2,780,603 | Burton | Feb. 5, 1957 |
| 2,872,418 | Hervert et al. | Feb. 3, 1959 |

OTHER REFERENCES

Stumpf et al.: "Therman Transformations of Aluminas and Alumina Hydrates," Ind. and Eng. Chem., vol. 42, pp. 1398–1403, July 1950.